L. A. BROWN.
BUTTER MERGING APPARATUS.
APPLICATION FILED SEPT. 9, 1914.
1,141,762.
Patented June 1, 1915.
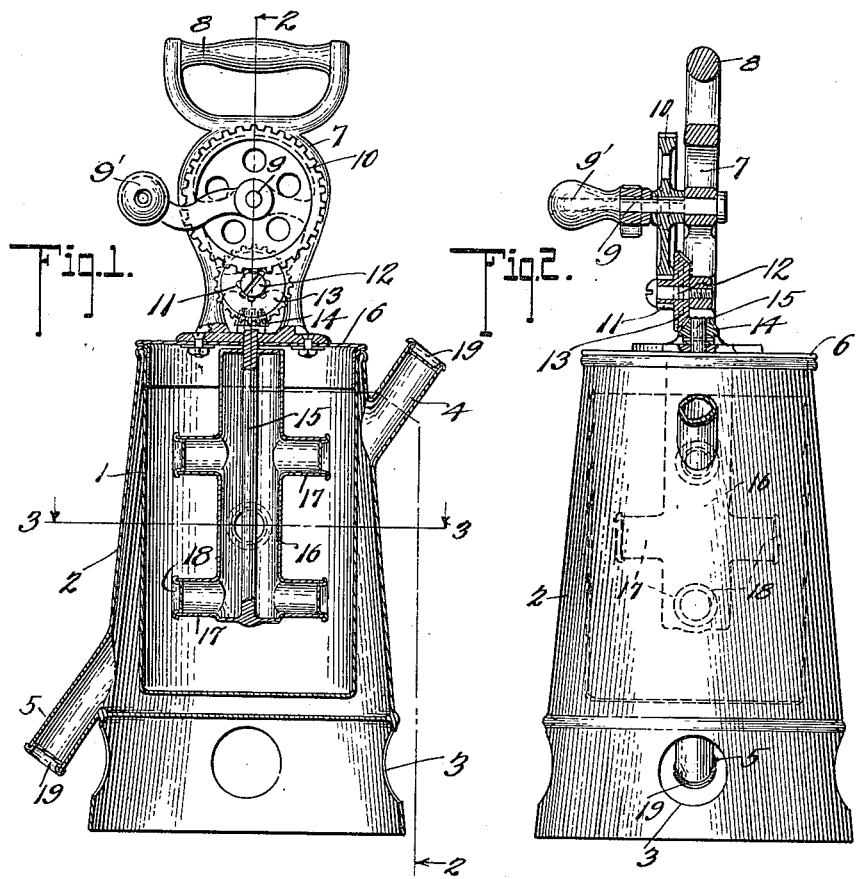
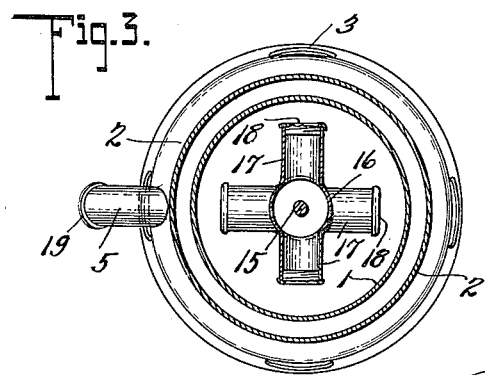
Witnesses
C. H. Wagner
D. R. Partello
Inventor
Lucius A. Brown
By Robb & Robb
Attorneys

UNITED STATES PATENT OFFICE.

LUCIUS A. BROWN, OF CLAY CENTER, NEBRASKA.

BUTTER-MERGING APPARATUS.

1,141,762.  Specification of Letters Patent.  Patented June 1, 1915.

Application filed September 9, 1914. Serial No. 860,915.

*To all whom it may concern:*

Be it known that I, LUCIUS A. BROWN, a citizen of the United States, residing at Clay Center, in the county of Clay and State of Nebraska, have invented certain new and useful Improvements in Butter-Merging Apparatus, of which the following is a specification.

This invention relates to improvements in apparatus for the treatment of butter and more particularly to such as is especially adapted for insuring effective merging of milk and butter.

The object in view is the effective control of the temperature of the substances acted upon for hastening and rendering more complete the merging or absorbing action.

With this and further objects in view, as will in part hereinafter become apparent and in part be stated, the invention comprises a milk container, an agitator adapted to be heated for raising the temperature of materials within the container and means for cooling the container and its contents.

The invention more specifically comprises a container surrounded by a casing spaced from the container and inclosing the same and having an intake nozzle and a discharge nozzle for a cooling medium, a cover for the container, a tubular agitator sustained by the cover and adapted to contain a heating medium, and means for actuating the agitator.

The invention comprises certain other novel constructions, combinations and arrangements of parts as will be hereinafter specified and claimed.

In the accompanying drawing, Figure 1 is a vertical central section through an apparatus embodying the features of the present invention, parts being seen in elevation, Fig. 2 is a similar section taken approximately on the plane indicated by line 2—2 of Fig. 1, the container being seen in elevation, Fig. 3 is a horizontal section taken on the plane indicated by line 3—3 of Fig. 1.

Referring to the drawing by numerals, 1 indicates a container inclosed by casing 2, the container being preferably cylindrical and the casing flaring downwardly from the upper portion of the container so as to provide an annular space about the container throughout its length, the space being narrow at the upper end of the container and widening downwardly. The bottom of the casing 2 is spaced below the bottom of the container so as to leave the container spaced from the casing at all points except at the upper end where the container is formed integral or fixed to the casing. As a convenient form of construction, casing 2 is preferably provided with an extended base 3 projecting below the bottom of the casing. An intake nozzle or tube 4 communicates with the casing 2 at the upper portion of the casing and at one side thereof, and a similar discharge nozzle or tube 5 similarly communicating with the casing at the lower portion thereof and at the diametrically opposite side so that the cooling medium entering through nozzle 4 must pass to the opposite side of container 1 before final exit through the nozzle 5.

A removable cap or cover 6 normally closes the upper end of a container 1.

A bracket 7 is fixed to and upstands from cover 6 and is provided with a handle or grip 8 for being grasped by the hand of the operator. Journaled in the bracket 7 is a stub shaft 9 engaged by an operating crank 9', and carrying a gear wheel 10 meshing with a pinion 11. The pinion 11 is journaled on a pin 12 or other appropriate shaft fixed to the bracket 7, and preferably formed integral with the pinion 11 is a bevel gear 13 meshing with a coöperating bevel gear 14. The gear 14 is fixed to a vertical pendent shaft 15 which extends through the base of bracket 7 and through the cap 6 down into the container 1, and within the container carries an agitator consisting of a tubular body 16 having radially extending tubular arms 17. The body 16 is formed integral with or otherwise appropriately fixed to the shaft 15. Each tubular arm 17 has its outer or free end closed by a cap 18 threaded into the arm, and the nozzles 4 and 5 are similarly closed by caps 19.

In operation, a quantity of milk and a quantity of butter are deposited in the container 1, as for example a pint of milk and a pound of butter, the butter being preferably cut into small pieces for facilitating melting. Prior to the application of the cap 6, one of the caps 18 is removed and the tubular body 6 and the several arms 17 are filled with warm water. The particular cap 18 is applied so as to prevent leakage of the water, the water being used merely as a heating medium for enhancing the preparation of the fatty globules of the butter for the reception of the portions of milk to be absorbed. The cap 6 is then applied to the receptacle 1 and crank 9 operated for agitating the mass within the container. This is continued until the butter has absorbed substantially all the milk which it is capable of receiving, and the cap 6 is then removed for removing the heating elements from the mass within the container, and cold water is supplied about the container 1 within the casing 2 through nozzle 4. The action of the cold water is to hasten the congealing of the butter and to harden the same which upon completion leaves the butter ready for use. The water supplied through nozzle 4 is preferably supplied in sufficient quantities to enable circulation by allowing water to drain out of the nozzle 5 at about the rate of its supply to nozzle 4, but it will be found sufficient to supply a charge of cold water to casing 1 and leave the nozzle 5 closed while the charge is acting to cool the contents of chamber 1, the difference in the action between the circulating water supply and the single charge being merely a matter of degree of time required for cooling the contents of container 1.

Since the absorption of the milk by the butter is a form of merging of one into the other for brevity and facility in the claims this action of absorption will be referred to as merging.

Having thus described the invention what I claim as new is:—

1. In a butter merging apparatus, the combination of a container, an agitator extending into the container comprising a tubular body and tubular arms extending radially therefrom, said body and arms being adapted to contain a medium for varying the temperature of the contents of the container, and means for rotating said body.

2. In butter merging apparatus, a temperature varying agitator comprising a tubular body and tubular arms disposed about the body and extending radially therefrom, and actuating means therefor, each of the arms having a detachable cap at its outer end.

3. In butter merging apparatus, a temperature varying agitator comprising a central shaft, a tubular body fixed to and carried by the shaft, tubular arms extending from the shaft, a detachable cap closing the outer end of one of the arms and means for rotating the shaft.

In testimony whereof I affix my signature in presence of two witnesses.

LUCIUS A. BROWN.

Witnesses:
W. S. REED,
L. F. FRYAR.

Copies of this patent may be obtained for five cents each, by addressing the "Commissioner of Patents, Washington, D. C."